United States Patent [19]
Park et al.

[11] Patent Number: 5,930,709
[45] Date of Patent: Jul. 27, 1999

[54] METHOD OF CREATING SIGNAL MESSAGE COMMON FILES FOR MOBILE SWITCHING CENTER

[75] Inventors: Kwang Roh Park; Jae Wook Shin, both of Daejon, Rep. of Korea

[73] Assignees: Electronics and Telecommunications Research Institute, Daejeon; Korea Telecommunication Authority, Seoul, both of Rep. of Korea

[21] Appl. No.: 08/962,352

[22] Filed: Oct. 31, 1997

[30] Foreign Application Priority Data

Dec. 12, 1996 [KR] Rep. of Korea ..................... 96-64712

[51] Int. Cl.$^6$ ................................................. H04Q 7/22
[52] U.S. Cl. ......................... 455/435; 455/412; 455/433; 455/445; 455/560; 707/1; 707/3; 707/10
[58] Field of Search ..................... 707/1, 3, 10; 455/412, 455/433, 435, 445, 560

[56] References Cited

U.S. PATENT DOCUMENTS

| | | |
|---|---|---|
| 5,579,372 | 11/1996 | Bo ............................................ 455/412 |
| 5,610,969 | 3/1997 | McHenry et al. ....................... 455/435 |
| 5,649,301 | 7/1997 | Yabusaki et al. ........................ 455/433 |
| 5,710,805 | 1/1998 | Armbruster et al. .................... 455/433 |
| 5,749,053 | 5/1998 | Kusaki et al. ............................ 455/524 |
| 5,752,189 | 5/1998 | Ueno et al. ............................... 455/435 |
| 5,787,349 | 7/1998 | Taketsugu ................................ 455/445 |
| 5,815,810 | 9/1998 | Gallant ..................................... 455/433 |
| 5,835,856 | 11/1998 | Patel ......................................... 455/406 |
| 5,835,860 | 11/1998 | Diachina ................................. 445/458 |
| 5,839,072 | 11/1998 | Chien ...................................... 455/445 |

*Primary Examiner*—Paul V. Kulik
*Assistant Examiner*—Jean R. Homere
*Attorney, Agent, or Firm*—Antonelli, Terry, Stout & Kraus, LLP

[57] ABSTRACT

A method of creating signal message common files for a mobile switching center which is capable of simplifying a process and effectively and directly creating a signal message common file is disclosed. The method includes the steps of registering a signal message descriptive file from an operator of each block, setting an environment for creating a signal message common file using a system formation material and a registered material information, checking whether there is an error during the above-described steps, and reporting the error to a manager or an operation when there is an error; receiving a signal message descriptive file using the environment set and creating a signal message common file which is to be updated in minimum with respect to the signal message updated using an updated signal message list and a block of a newly registered block; creating a signal message definition file which is matched with a characteristic of a corresponding language and processor using a signal message common file list which is created and should be updated and an execution module name list which is to be updated; and creating a signal message identifier file which is matched with a characteristic of a corresponding language and a processor using a signal message common file list which is created.

5 Claims, 3 Drawing Sheets

```
#<VERSION NAME> <MESSAGE NAME> <MESSAGE CHARACTERISTIC>
 <OUTHLINE FOR MESSAGE>

.dr<MESSAGE TRANSMITTING SIDE>... →...<MESSAGE RECEIVING SIDE>...

.dr<MESSAGE TRANSMITTING SIDE>... →...<MESSAGE RECEIVING SIDE>...
 ...
 ...

<USER'S DEFINITION FOR MESSAGES>
 ...
 ...
```

METHOD OF CREATING SIGNAL MESSAGE COMMON FILES FOR MOBILE SWITCHING CENTER

BACKGROUND OF THE INVENTION

1. Field of the Invention

The present invention relates to a method of creating signal message common files for a mobile switching center, and in particular, to an improved method of creating signal message common files for a mobile switching center which is capable of directly creating a signal message common file based on a signal message descriptive file for a mobile switching center.

2. Description of the Conventional Art

The TDX-10 MX mobile switching center (hereinafter called as TDX-10 MX MSC) is a high capacity switching unit having a distributed structure formed of a plurality of processors each performed a predetermined function. More than one execution module which is created by a block, which is a unit of a mobile switching center, is loaded and performed. In each block, a signal message, which is called as an Inter Processor Communication (IPC), is exchanged, thus performing its inherent function, and an interoperation of the blocks based on a transmission of a signal message determines the operation of the entire switching center.

The technique for exchanging the signal messages is expressed by a signal message descriptive file by the related block, and a signal message common file is created based on the signal message descriptive file of each block, and then is compiled. Thereafter, an execution module is loaded into a corresponding processor, and the signal message is exchanged between the related blocks, thus performing a predetermined function. Therefore, in order secure a normal operation, the signal message should have a signal message identifier and a signal message name for a mobile switching center.

Here, the signal message common file correctively means a signal message defining file and a signal message identifier creating file which are needed for compiling a block source based on the signal message descriptive file.

In order to effectively process the above-described procedure, it is needed to accurately check an interrelationship between the signal message descriptive file which is registered by a software block operator and a system common file which is managed by a manager, and it is important to effectively and correctively manage a complex interrelationship between the signal message descriptive files. In addition, in the software block of the mobile switching center, since a high level processor is programmed by a CHILL language and a low level processor is programmed by a C-language and an assembly language, the signal message common files should be created based on the characteristic of a corresponding language.

However, the conventional tools are implemented using a unix shell script and a CHILL (CCITT high level language), and much time is required due to its characteristic. In addition, the signal message descriptive file which is programmed by C-language or assembly language has many problems for creating a common file. Therefore, since the operator of the block which is programmed by C-language or assembly language announces a signal message common file in a source program, thus using the same, it is very difficult for the operator to effectively a complex interrelationship between the files. In addition, much time and cost are required for repeatedly and sequentially performing a predetermined process such as a checking process of a signal message descriptive file which is programmed by a CHILL language and a signal message common file. Furthermore, in the case that there is a predetermined change in a few signal message descriptive files without changing a plurality of signal message descriptive files, the entire processes are disadvantageously performed, thus increasing time consumption, and it is difficult for the manager for managing a source program compile.

SUMMARY OF THE INVENTION

Accordingly, it is an object of the present invention to provide a method of creating signal message common files for a mobile switching center which overcomes the aforementioned problems encountered in the conventional art.

It is another object of the present invention to provide an improved method of creating signal message common files for a mobile switching center which is capable of directly extracting and optimizing a token from a signal message descriptive file registered by a user without using a shell script and a CHILL compiler, and creating a signal message common file and a common file with respect to only a signal message descriptive file which is changed. The package fabrication time is significantly reduced for fabricating a mobile switching center by reducing time and manpower consumption which are needed for managing and creating a common data and more easily managing a compile operation.

It is another object of the present invention to provide an improved method of creating signal message common files for a mobile switching center which is capable of significantly reducing time required for creating a signal message common file based on a signal message common file creating method by extracting a token using only a signal message descriptive file which is changed.

It is another object of the present invention to provide an improved method of creating signal message common files for a mobile switching center which is capable of simplifying a process for creating a signal message common file and effectively and directly creating a signal message common file.

To achieve the above objects, there is provided a method of creating signal message common files for a mobile switching center which includes the steps of a first step (S1 through S9) for registering a signal message descriptive file from an operator of each block, setting an environment for creating a signal message common file using a system formation material and a registered material information, checking whether there is an error during the above-described steps, and reporting the error to a manager or an operator when there is an error, a second step (S10 through S20) for receiving a signal message descriptive file using the environment set in the first step and creating a signal message common file which is to be updated in minimum with respect to the signal message updated using an updated signal message list and a block of a newly registered block, a third step (S21 through S26) for creating a signal message definition file which is matched with a characteristic of a corresponding language and processor using a signal message common file list which is created in the second step and should be updated and an execution module name list which is to be updated, and a fourth step (S27 through S32) for creating a signal message identifier file which is matched with a characteristic of a corresponding language and a processor using a signal message common file list which is created in the second step and should be updated.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figures 1, 2:
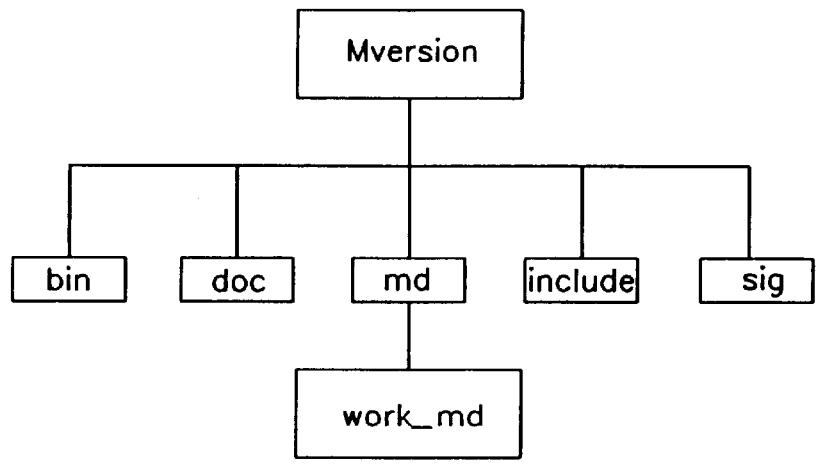
FIG. 1 is a view illustrating the construction of a software which is used for creating a signal message common file for a mobile switching center according to the present invention.
FIG. 2 is a view illustrating the construction of a signal message descriptive file which is used for creating a signal message common file according to the present invention.

FIG. 1 illustrates the construction of a software which is needed to create a signal message common file for a mobile switching center. As shown therein, when the current version of a mobile switching center software is Mversion, "bin and doc" denote a directory having environment setting files, and "md and work_md" denote a directory having a signal message descriptive file which is newly registered by a manager and a signal message descriptive file which is previously registered and managed by a manager. "include" denote a directory having a system common file which is managed by a manager, and "sig" denotes a directory having a signal message common file which is created for an operator of each block to perform a compiling operation.

FIG. 2 illustrates the construction of a signal message descriptive file for a mobile switching center. As shown therein, "#" is always positioned in a first column as a separator for separating different signal messages in a signal message descriptive file. "Version name" denotes a version name of a software which is currently processed. "Message name" is should be announced in the entire mobile switching center under the rules set in the mobile switching center for increasing an interpreting ability of the signal message name. "Message characteristic" denotes a functional characteristic of a signal message and is formed of three digits of a priority, a signal massage kind, and a signal message type. "Outline for a message" denotes a description concerning the function of a signal message in order to increase an understanding level. In addition, ".dr" denotes an item for indicating a transmission and receiving block of a signal message and is always positioned in a first column. A "message transmitting side" should be defined in a system as a block name or process name which system transmits a signal message, and the block name or process name may be described thereby.

"—>" denotes an identifier for identifying a block name or a process name for transmitting and receiving a signal message.

"Message receiving side" should be defined in a system as a block name or a process name for receiving message. In addition, the description of the block name or the process name is available thereby.

"User's definition for message" denotes an item for defining a related document type when the type of the signal message is announced as a user's definition type based on "Message characteristic".

Figure 3A:
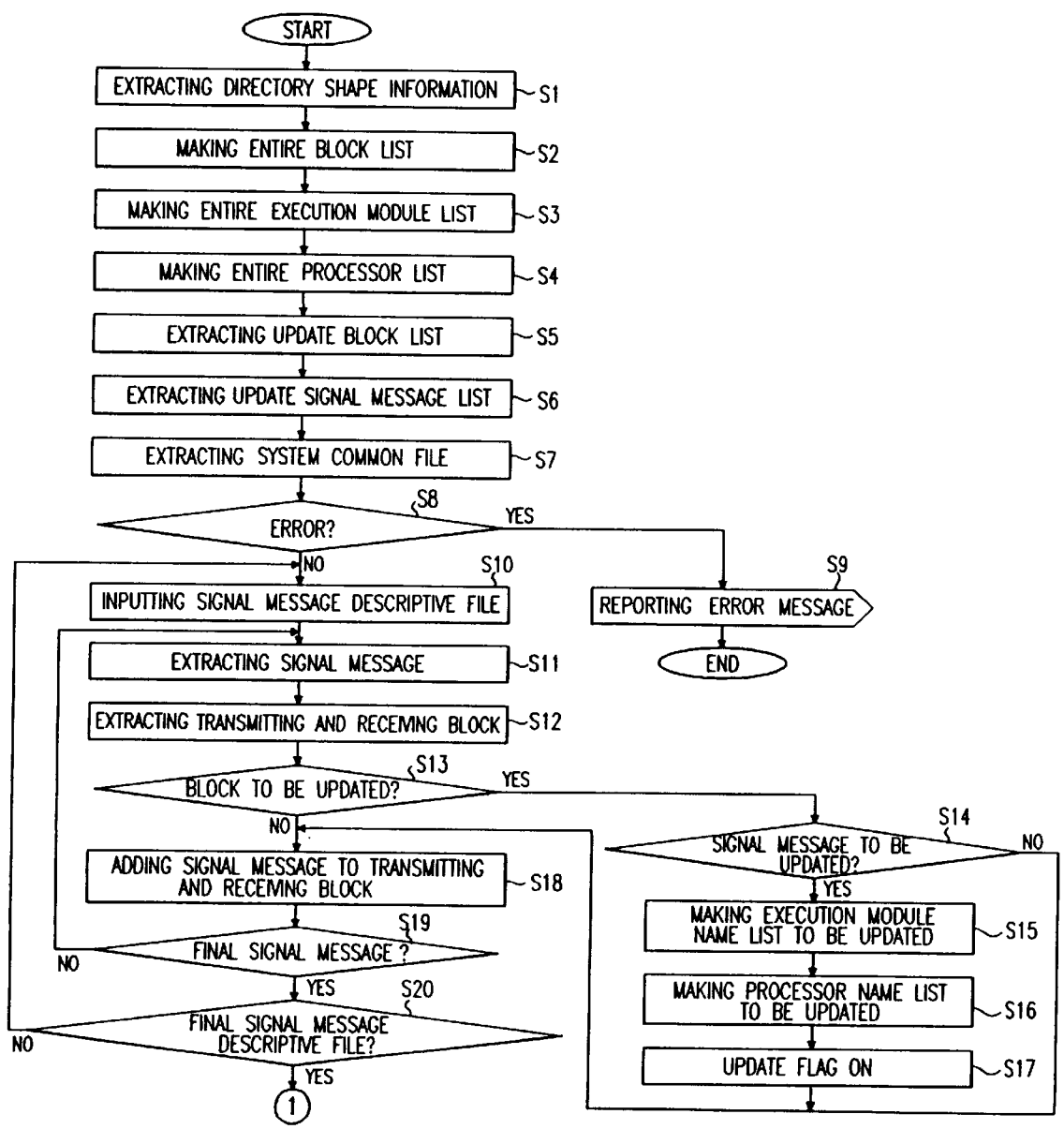
FIGS. 3A and 3B are flow charts of a method for creating a signal message common file for a mobile switching center according to the present invention.
Figure 3B:
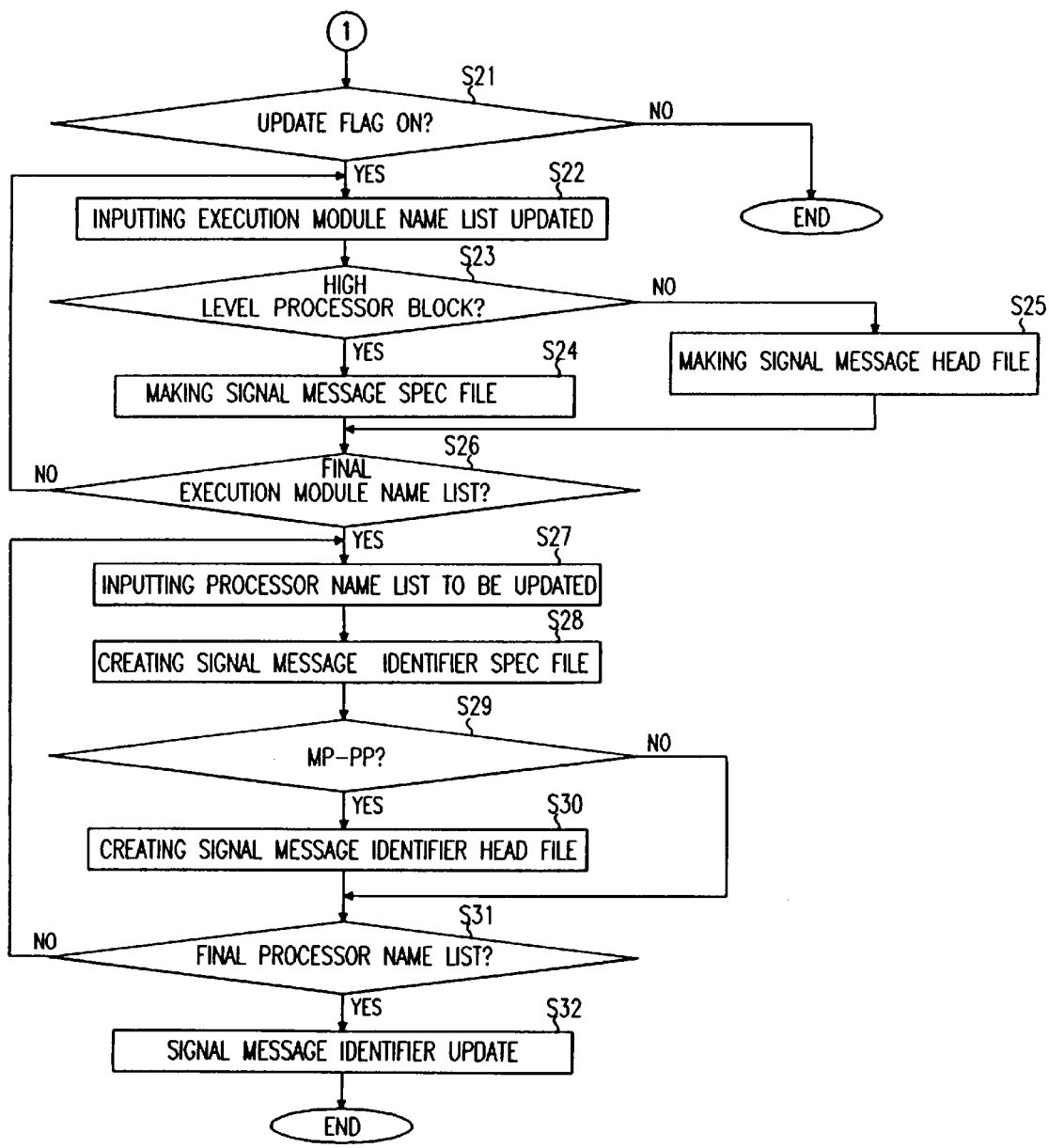

FIG. 3 illustrates a flow chart of a process for creating a signal message common file for a mobile switching center. As shown therein, a directory shape information is extracted for creating a signal message common file based on a "bin" directory of FIG. 1 in Step S1, and a block name list (in Step S2) which is registered in from the "doc" directory, an execution module name list (in Step S3) which is used in the system, and a processor name list (in Step S4) are made. Next, a newly registered block list is extracted from the "md" directory in Step S5, and a signal message list which needs an update from the signal message descriptive file in the "md" directory and the "work_md" directory is extracted in Step S6. In addition, a system common file is extracted in order to check the registered signal message and the common file in Step S7. An error is checked whether it is found in Steps S1 through S7 in Step S8, and if there is an error as a result of Step S8, an error message having an error message code is sent to a manager and operator in Step S9, and then the routine is completed.

If there is not error as a result of Steps S1 through S7, the signal message descriptive file in the "work_md" directory is inputted based on the block name list (of Step S2). A signal message name is extracted in Step S11 based on "#", which is a signal message separator of FIG. 2, from the inputted signal message descriptive file, and a signal message transmitting and receiving block is extracted from the ".dr" field in Step S12. In addition, it is judged whether the inputted signal message descriptive file of Step S10 exists in the list of a newly registered block. If the signal message descriptive file exists in the list of the block, it is judged in Step S14 whether the message exists in the signal message list of Step S6 in order to judge whether the corresponding signal message corresponds to the signal message which needs an update. At this time, if the corresponding signal message exists in the list which needs an update, the execution mobile name list, which is to be updated based on the execution module name list of Step S3, is made in Step S15, and the processor name list is made in Step S16 based on the processor name list of Step S4. In addition, a flag for indicating that there is a signal message common file which needs an update is set in Step S17. A signal message is added in Step S18 to the transmitting and receiving block which is extracted in Step S12 from the ".dr" field, and this signal message is judged in Step S19 to be the final signal message of the signal message descriptive file of Step S10. If the message is not the final signal message, Steps S11 through S18 are repeatedly performed with respect to the next signal messages based on "#" which is the signal message separator of FIG. 2, and if the signal is the last signal message, the corresponding file is judged to be the last signal message descriptive file in Step S20.

If the corresponding signal message does not exist in the list of Step S6 which needs an update, or if the same does not exist in the list of Step S5 of a newly registered block, since a signal message common file creating operation is not needed due to the corresponding block, the signal message is added to the transmitting and receiving block in Step S18, and then this signal message is judged in Step S19 to be the final signal message of the signal message descriptive file of Step S10. If the signal is not the final signal message, Steps S11 through S18 are repeatedly performed with respect to the next signal messages based on "#" which is the signal message separator of FIG. 2, and if the signal is the final signal message, the corresponding file is judged to be the final signal message descriptive file in Step S20.

The minimum signal message common file list related with the update signal message of the block changed during the above-described steps is created.

Next, a flag is set in Step S21 in order to indicate that there is a signal message common file which needs an update for creating a signal message definition file among the signal message common files based on the signal message common file update list. If the flag is not set, since there is not the common files to be newly created, the routine is finished. If the flag is set, the execution module name is inputted in Step S22 from the first order based on the execution module name list of Step S15 which is to be updated, and since the names of the signal message definition files are made different which are to be created in accordance with the characteristic of the processor, the corresponding block is judged to be whether it relates to the block of the high level processor or the low level processor in Step S23. If the corresponding block corresponds to the block of the high level processor, the signal message spec file is made such that the program made by the CHILL language is used for a compile in Step S24, and if the corresponding block corresponds to the low level processor, the signal message head file in made in Step S25 such that the program made of C-language is used for a compile. If the above-described routines are completed, the corresponding execution module is judged to be the final module based on the execution module name list of Step S15 which is to be updated, and if the module is the final module, a signal message definition file creating step is performed. However, if the execution module which is not in the execution module list of Step S15 exists, the above-described steps S22 through S25 are repeatedly performed with respect to the next execution module.

Finally, in order to create the signal message identifier file among the signal message common files based on the signal message common file update list, the processor names from the first name thereof are sequentially inputted based on the processor name list of Step S16, and the signal message identifier spec file is created in Step S28. Here, the signal message common files which are used for a compiling are different in accordance with the characteristic of the language of the source program, the name of the signal message identifier file should be differently created. Namely, the signal message identifier file is classified into a signal message identifier spec file and a signal message identifier head file. In addition, the signal message identifier spec file is classified into a file related to one high level processor only, a file related to a high level processor which performs a communication with low level processor, and a file related to more than two high level processors. In addition, the signal message identifier head file is classified into a file related to a low level processor which is programmed by an assembly language and a file related to a low level processor which is programmed by C-language. Therefore, in order to create a signal message identifier file for matching with the characteristic of each language, it is judged whether a corresponding execution module name is an MP_PP in Step S29, and when the module name is an MP_PP, the signal message identifier head file is created in Step S30.

When the signal message identifier file creating is completed with respect to one processor name, it is judged whether the name is the final processor name based on the processor name list of Step S16 which is to be updated, and if the name is not the final name, the above-described steps S27 through S30 are repeated. If the name is the final name, the signal message identifier with respect to the added signal message is updated in Step S32, and the signal message identifier file creating operation is completed. If the execution module name is not MP_PP, the name is judged to be the final processor name based on the processor name list of Step S16 which is to be updated, and if the name is not the final name, the above-described steps S27 through S30 are repeated, and if the name is the final name, the signal message identifier is updated in Step S32, and the signal message identifier creating operation is completed.

As described above, when creating a signal message common file to be matched with the characteristic of a mobile switching center software block which is variously programmed by a language such a CHILL language, C-language, assembly language, etc., the token is directly extracted based on a signal message descriptive file of each block registered by a software block operator, and an optimized signal message common file such as a signal message definition file and a signal message identifier file which are used for compiling a block source is created. In addition, since the common file is created with respect to only the signal message descriptive file which is changed, it is possible to effectively cope with the continuous variations of a plurality of data and correctively manage a complex interrelationship between the signal message descriptive files, thus reducing a managing and creating time of a common data and more easily performing a compile, whereby a package fabrication time is significantly decreased.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A method of creating signal message common files for a mobile switching center, comprising the steps of:

a first step (S1 through S9) for registering a signal message descriptive file from an operator of each block, setting an environment for creating a signal message common file using a system formation material and a registered material information, checking whether there is an error during the above-described steps, and reporting the error to a manager or an operator when there is an error;

a second step (S10 through S20) for receiving a signal message descriptive file using the environment set in the first step and creating a signal message common file which is to be updated in minimum with respect to the signal message updated using an updated signal message list and a block of a newly registered block;

a third step (S21 through S26) for creating a signal message definition file which is matched with a characteristic of a corresponding language and processor using a signal message common file list which is created in the second step and should be updated and an execution module name list which is to be updated; and a fourth step (S27 through S32) for creating a signal message identifier file which is matched with a characteristic of a corresponding language and a processor using a signal message common file list which is created in the second step and should be updated.

2. The method of claim 1, wherein said first step includes the sub-steps of:
- a first sub-step (S1) for extracting a directory shape information for a file which is needed for creating a signal message common file;
- a second sub-step for making a block name list (S2) which is registered in the system, an execution module name list (S3) which is used for the system, and a processor name list (S4);
- a third sub-step for extracting (S5) a newly registered block list and extracting (S6) a signal message list from the signal message descriptive file;
- a fourth sub-step for extracting (S7) a system common file for checking the registered signal message and the common file; and
- a fifth sub-step for checking (S8) whether an error is found during the sub-steps (S1 through S7) and informing (S9) a manager and an operator of an error message having an error message code.

3. The method of claim 1, wherein said second step includes the sub-steps of:
- a first sub-step for inputting (S10) a signal message descriptive file based on a block name list (S2) when there is not an error in the first step;
- a second sub-step for extracting (S11) a signal message name based on a signal message separator (#) from the inputted signal message descriptive file and extracting (S12) a signal message transmitting and receiving block from the signal message transmitting and receiving block field (.dr);
- a third sub-step for judging (S13) whether the inputted signal message descriptive file (S10) is a block to be updated based on the presence thereof in the newly registered block list (S5) and judging (S14) whether the signal message list (S6) exists in order to judge whether a corresponding signal message is a signal message which is needed to be updated when there is a newly registered block list;
- a fourth sub-step for making (S15) an execution module name list based on the execution module name list (S3) when the corresponding signal message exists in the list to be updated and the signal message is to be updated as a result of the third sub-step, making (S16) a processor name list based on the processor name list (S4), and setting (S17) a flag in order to indicate a state that there is a signal message common file which is needed to be updated together with the list making sub-step (S16);
- a fifth sub-step for adding (S18) a signal message to the transmitting and receiving block extracted (S12) from the signal message transmitting and receiving block field (,dr) when the block is not the block to be updated after the flag setting (S17) and the signal message is not the signal message to be updated as a result of the judgement (S14); and
- a sixth sub-step for judging (S19) whether the added signal message is the final signal message of the signal message descriptive file (S10), repeatedly performing the sub-steps (S11 through S18) with respect to the next signal message based on the signal message separator (#) when the signal message is not the final signal message, and judging (S20) whether the corresponding file is the final signal message when the signal is the final signal message.

4. The method of claim 1, wherein said third step includes the sub-steps of:
- a first sub-step for judging (S21) whether a flat is set in order to indicate there is a signal message common file to be updated when the signal corresponds to the final signal message descriptive file as a result of the second step and judging as a condition that there is not a common file to be newly created when the flag is not set;
- a second sub-step for sequentially inputting (S22) execution module names from the first name thereof based on the execution module name list (S15), which is to be updated, when the flag is set as a result of the judgement (S21) and judging (S23) whether a corresponding block corresponds to the block which is in the low level processor when the corresponding block is not the block which is in the high level processor;
- a third sub-step for making (S24) for a signal message spec file so that the program which is made by a CHILL language is used for a compile when the corresponding block in the block which is in the high level processor and making (S25) a signal message head file so that a program which is programmed by a C-language is used for a compile when the corresponding block is the block which is in the low level processor; and
- a fourth sub-step for judging (S26) whether the corresponding execution module is the final module based on the execution module name list (S15) after the sub-step S24 or S25 is completed and repeatedly performing the sub-steps S22 through S25 with respect to the next execution module when the module is not the final execution module as a result of the judgement (S26).

5. The method of claim 1, wherein said fourth step includes the sub-steps of:
- a first sub-step for sequentially inputting (S27) the processor names from the first processor name based on the processor name list (S16), which is to be updated, in order to create a signal message identifier file among the signal message common files based on the signal message common file update list when the head file making sub-step (S25) is the final step and creating (S28) a signal message identifier spec file;
- a second sub-step for judging (S29) a corresponding execution module name is an MP_PP in order to create a signal message identifier file which corresponds to the characteristic of each language and creating (S30) a signal message identifier head file when the module name is the MP_PP as a result of the judgement (S29);
- a third sub-step for judging (S31) whether there is a final processor name based on the processor name list (S16), which is to be updated, when the signal message identifier file creating is completed with respect to one processor name and repeating the sub-steps S27 through S30 when the name is not the final processor name; and
- a fourth sub-step for updating (S32) the signal message identifier with respect to the added signal message when the processor name is the final name as a result of the judgement (S31) and completing the signal message identifier file creating step.

* * * * *